United States Patent
Urivskiy et al.

(10) Patent No.: US 8,054,973 B2
(45) Date of Patent: Nov. 8, 2011

(54) USER KEY MANAGEMENT METHOD FOR BROADCAST ENCRYPTION (BE)

(75) Inventors: Alexei V. Urivskiy, Moscow (RU); Andrey L. Chmora, Moscow (RU)

(73) Assignee: Samsung Electronics Co., Ltd., Suwon-si (KR)

(*) Notice: Subject to any disclaimer, the term of this patent is extended or adjusted under 35 U.S.C. 154(b) by 1340 days.

(21) Appl. No.: 11/285,296

(22) Filed: Nov. 23, 2005

(65) Prior Publication Data

US 2006/0159270 A1 Jul. 20, 2006

(30) Foreign Application Priority Data

Dec. 30, 2004 (RU) .................................. 2004138815
Jul. 1, 2005 (KR) .......................... 10-2005-0059182

(51) Int. Cl.
*H04L 9/08* (2006.01)

(52) U.S. Cl. .......... 380/278; 380/277; 705/71; 713/171; 726/1; 726/22; 726/26

(58) Field of Classification Search .................. 380/278, 380/277; 705/71; 713/171; 726/1, 2, 22, 726/26

See application file for complete search history.

(56) References Cited

U.S. PATENT DOCUMENTS

| | | | | |
|---|---|---|---|---|
| 5,712,800 A | * | 1/1998 | Aucsmith | 380/277 |
| 5,850,444 A | * | 12/1998 | Rune | 705/79 |
| 2003/0120931 A1 | * | 6/2003 | Hopkins et al. | 713/180 |
| 2005/0097317 A1 | * | 5/2005 | Trostle et al. | 713/163 |

* cited by examiner

*Primary Examiner* — Edan Orgad
*Assistant Examiner* — Roderick Tolentino
(74) *Attorney, Agent, or Firm* — Sughrue Mion, PLLC (57) ABSTRACT

A broadcast encryption (BE) for acquiring an encryption key which is used to decrypt a session key by a node receiving services, with less computation overhead. A plurality of subgroups, each consisting of at least one of a plurality of nodes, are generated, and layers are formed according to a number of nodes which form the subgroup. Prime numbers are assigned to the subgroups not to overlap one another, and a subgroup at an upper layer is connected with a subgroup, which includes nodes forming the subgroup of the upper layer, at a lower layer. A prime number assigned to a subgroup at an upper layer, a prime number assigned to an unconnected subgroup at the same layer, and a prime number assigned to a subgroup at a lower layer, are re-assigned to each subgroup, and an encryption key which is generated from the re-assigned prime numbers is assigned to the each group.

7 Claims, 6 Drawing Sheets

USER KEY MANAGEMENT METHOD FOR BROADCAST ENCRYPTION (BE)

CROSS-REFERENCE TO RELATED APPLICATIONS

This application claims the benefit under 35 U.S.C. §119 (e) of Russian Patent Application No. 2004/138815 filed on Dec. 30, 2004 in the Russian Patent and Trademark Office, and priority from Korean Patent Application No. 2005-59182 filed on Jul. 1, 2005 in the Korean Intellectual Property Office, the entire disclosures of which are incorporated herein by reference.

BACKGROUND OF THE INVENTION

1. Field of the Invention

Methods consistent with the present invention relate to a broadcast encryption (BE). More particularly, the present invention relates to an efficient user key management method for a broadcast encryption (BE).

2. Description of the Related Art

Broadcast encryption (BE) is a technique for a transmitter, that is, a broadcast center, to effectively transmit information only to intended users among all users. The BE needs to effectively work in case that the aggregation of the users who are to receive the information changes arbitrarily and dynamically. The most crucial property of the BE is to revoke or exclude unintended users, for example, illegal users or expired users.

Figure 1:
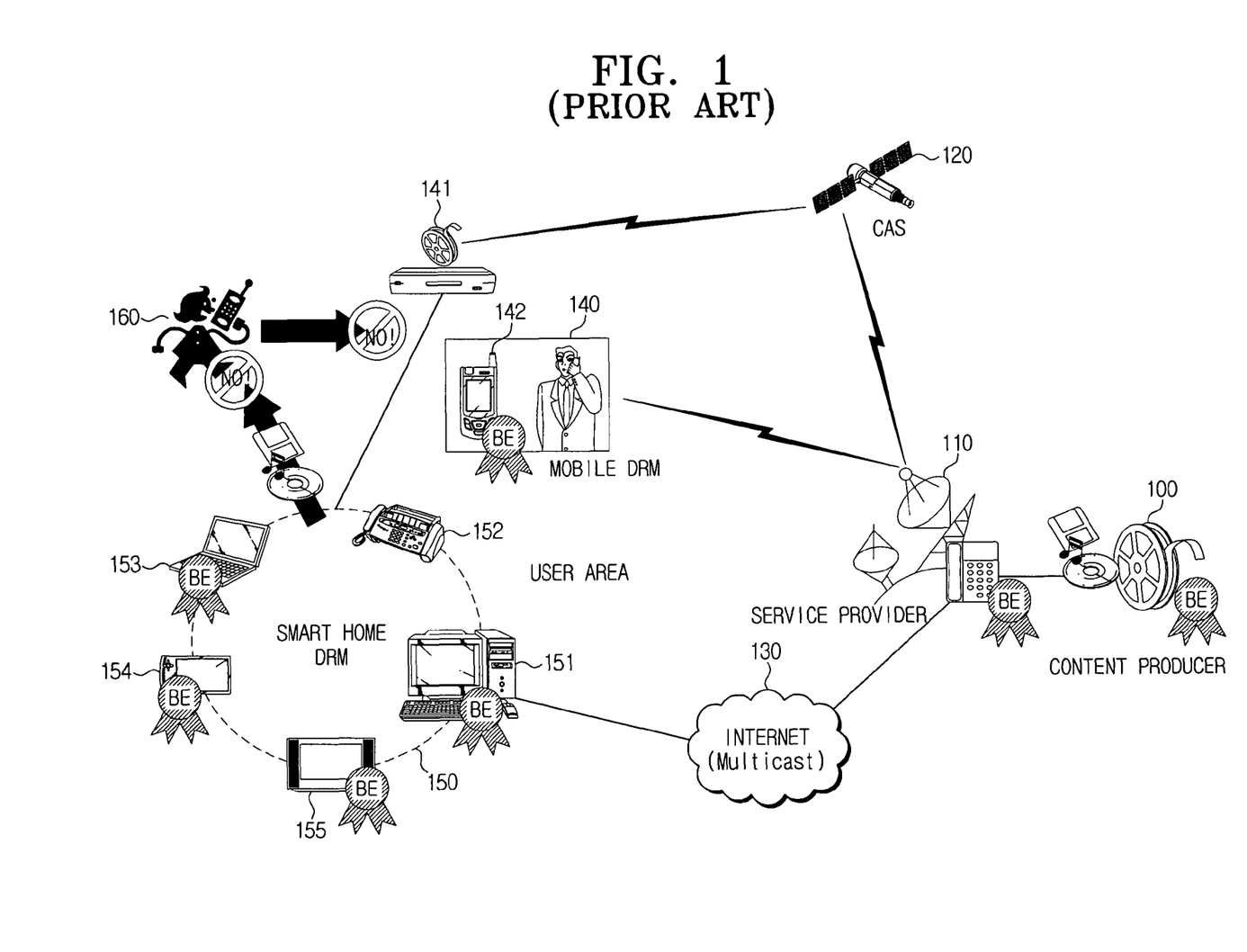
FIG. 1 illustrates a network configuration of a data transmission system for a general broadcast encryption (BE)

FIG. 1 illustrates a network of a data transmission system according to a conventional BE. Referring to FIG. 1, a content producer 100 creates various usable data including audio data and video data, and provides the created data to a service provider 110. The service provider 110 broadcasts the data, which is provided from the content producer 100, to authorized users who have paid for the data via wired and wireless communication networks such as a mobile digital right management (DRM) network 140 or a smart home DRM network 150.

Specifically, the service provider 110 can transfer data to users' devices such as set-top boxes equipped with satellite receivers via a satellite 120 and transfer data to a mobile communication terminal 142 via a mobile communication network. In addition the service provider 110 can transfer data to terminals 151 through 155 in the smart home DRM network 150 over an Internet 130.

During such data transmissions, data are encrypted using the BE so as to prevent an illegal user 160 who has not paid for the data, from acquiring and utilizing the data.

Security of the encryption and decryption systems depends on a system which is responsible for the encryption key management. The most important concern of the encryption key management system is how to derive encryption keys. How to manage and update the derived encryption keys are also critical issues.

The concept of the BE, which was initially suggested in 1991, has passed through considerable changes. The current BE presumes stateless receivers. The stateless receivers imply that secret keys of the users are not changed or updated at all as a session changes. The term 'k-resilient' is used in the security field. 'k-resilient' denotes that k-ary revoked users cannot recover the original information even through collusion attacks. Typically, 'r' indicates the number of revoked users. Thus, 'r-resilient' implies that the information can be protected against collusion attacks by all the revoked users.

The BE puts emphasis on a transmission overhead, a storage overhead, and a computation overhead. The transmission overhead denotes an amount of headers to be transmitted from the transmitter, the storage overhead denotes an amount of secret keys to be stored by the users, and the computation overhead denotes an amount of computations required to obtain a session key. Particularly, how to reduce the transmission overhead is a critical issue. Initially, the transmission overhead was in proportion to N which is the number of users, but now is reduced to be proportional to r which is the number of revoked users. As schemes in which the transmission overhead is proportional to r are suggested, how to reduce the transmission overhead to below r is of great concern.

Amongst results presented up to now, the Subset Difference (SD) method presented by Naor-Naor-Lotspiech shows the most excellent results. As for n-ary users in total, the SD method requires the storage overhead $O(\log 1+en)$ and the transmission overhead $O(2r-1)$.

However, the SD method is not efficient to be used by a plurality of users.

As described above, since Berkovits first announced a paper on BE in 1991, various algorithms have been suggested. Secret sharing, a subset cover-free system model, a tree structure, and the like are important algorithms.

First, the secret sharing-based model is schematically explained. The secret sharing-based model was first suggested by S. Berkovits in 1991 and then improved in a paper entitled "Efficient Trace and Revoke Schemes" by M. Noar and B. Pinkas in 2000. In "How to Broadcast a Secret" by S. Berkovits, a polynomial interpolation method and a vector-based secret sharing method were suggested.

In the polynomial interpolation method, a center, that is, a broadcast center or a transmitter, transmits points $(x_i, y_i)$ to individual users via a secret channel. Here, $x_i$ varies, and $(x_i, y_i)$ are secret keys of the individual users. The center selects a polynomial P having a random integer j and a degree t+j+1 to broadcast secret information S to t-ary authorized users of each session. The polynomial P passes secret keys $(x_i, y_i)$ of the t-ary authorized users and j-ary random points (x, y) and (O, S) that are not secret keys of other users. The center transmits t+j points and other points on the polynomial P. The t-ary authorized users know about a point (their own secret keys) besides the t+j points, and thus can restore the polynomial P having the degree t+j+1 and obtain the secret information S. However, the revoked users know only about the t+j points and thus cannot restore the polynomial P.

In the polynomial interpolation method, a transmission overhead is $O(t+j+1)$, a storage overhead is $O(1)$, and a computation overhead is about $t^3$ times. Also, revocation is easy, collusion can be prevented, and traitor tracing is possible. However, the polynomial interpolation method is inefficient for a large number of users. Also, in a case where the polynomial interpolation method is repeatedly used, the polynomial interpolation method is not safe for multiple users. Thus, the polynomial interpolation method cannot be substantially used.

"Efficient Trace and Revoke Schemes" by M. Noar and B. Pinkas uses a threshold secret sharing method using a Lagrange's interpolation formula. In the method by Noar-Pinkas, r polynomial can be restored with r+1 points on the r polynomial, but not with r points. In more detail, the center selects a random t polynomial P and offers different points on the random t polynomial P to individual users. If r-ary users are excluded, the center sums secret keys of the r-ary users and randomly selected t-r points and then broadcasts information as to t-ary points. As a result, although the excluded users sum their secret information, they know only about the t points. Non-excluded users can know about t+1 points and thus restore the polynomial P. A session key value P(0) is obtained using the polynomial P.

This method facilitates revocation, prevents collusion, and enables traitor tracking. In particular, new users can be added, a transmission overhead is O(t), and a storage overhead is O(1). Thus, this method is considerably efficient. However, users more than t that are a first determined number cannot be excluded. In addition, a computation overhead necessary for computing a number of transmitted points or a polynomial depends on t. Thus, this method is inefficient in many situations. Moreover, as t becomes large, computation time is increased. Thus, it is difficult to use this method when a plurality of users is included.

In the subset cover-free system model, when a set of all users is S, a subset cover-free system is defined in a set whose members are subsets of the set S. If such a system can be found, a BE can be performed using the system. However, a storage overhead and a transmission overhead are about O(r log n). Thus, the subset cover-free system model is inefficient. Also, a method of expanding an 1-resilient model into a k-resilient model was introduced. An 1-resilient scheme can be relatively easily invented. Thus, such an expansion appears meaningful. However, the efficiency of the 1-resilient scheme is greatly deteriorated during the expansion.

Methods using a tree structure have been recently noticed. C. K. Wong, M. Gouda, and G. S. Lam suggested a Logical-tree-hierarchy (LTH) in 1998. However, in the LTH, a large number of users cannot be excluded in a one-time session. Also, as a session goes by, secret keys of users are changed. Thus, the LTH is distant from the current BE supposing stateless receivers. Thereafter, D. Naor, M. Naor, and J. Lotspiech suggested "Complete Subset (CS) Cover Scheme" and "Subset Difference (SD) Scheme" in 2001. On the supposition that a number of users is n and a number of excluded users is r in both methods, the center forms a binary tree having a height of log n and assigns corresponding secret keys to all nodes. Also, the center allocates users to leaf nodes one by one.

As for the CS Cover scheme, each user receives and stores secrete keys of all nodes positioned on a path from a root node to the user's leaf node from the center. A subtree not including excluded users is called a CS. If such CSs are appropriately collected, the CSs can include only non-excluded users. At this time, if a session key is encrypted with a secret key corresponding to a root node of used CSs and then transmitted, authorized users can restore the session key. However, since excluded users are not included in any CSs, the excluded users cannot restore the session key.

Figure 2:
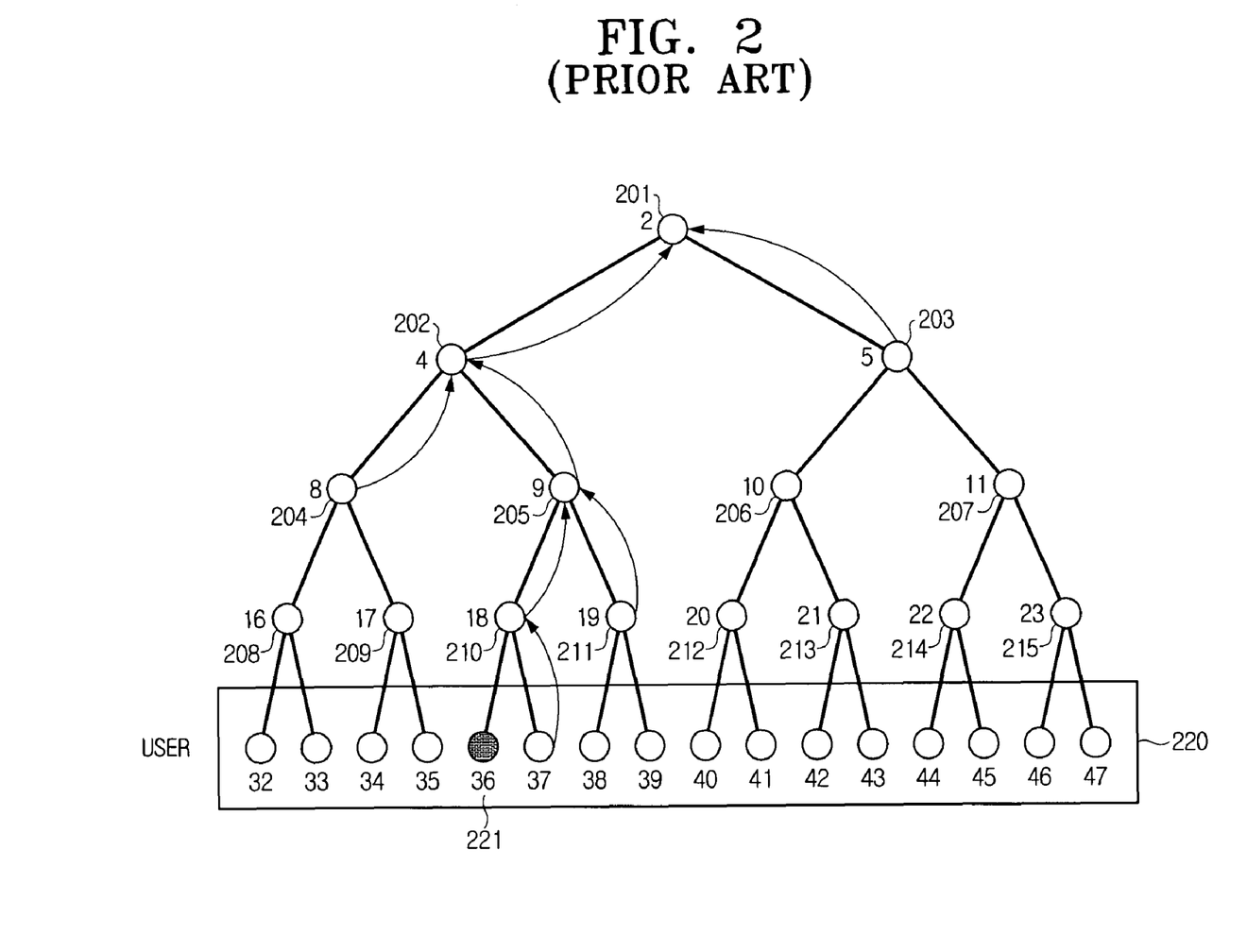
FIG. 2 illustrates a concept of the BE which assigns keys in a conventional tree structure.

FIG. 2 is a view illustrating the concept of the BE in which keys are assigned in a conventional tree structure. Referring to FIG. 2, nodes 220 receiving data through a BE scheme have their own key values 32 through 47 and key values of nodes connected to them on a tree.

For example, a node 34 has its own key value 34, a key value 209 of a node 17, a key value 204 of a node 8, a key value 202 of a node 4, and a key value 201 of a node 2. The node 34 shares the key value 209 of the node 17 with a node 35. Also, nodes 32, 33, and 35 share the key value 204 of the node 8 with the node 34.

If the nodes 32 through 47 represent all authorized users, a header of data to be transmitted includes the key value 201 of the node 2 so that the data is equally transmitted to all of the authorized users. Thus, the data may be transmitted securely.

If a user 36 is a revoked user, the key values relating to the node 36 should be updated since other users share key values of nodes related to the node 36. Specifically, key values 210, 205, 202, and 201 of the nodes 18, 9, 4, and 2 must be updated. The key values are updated from a lower node to an upper node.

Since the node 37 shares the key value 210 of the node 18, an updated key value 210 of the node 18 is encrypted as a key value of the node 37 and then transmitted to the node 37. The node 37 and the nodes 38 and 39 under the node 19 share the key value 205 of the node 9. Thus, an updated key value 205 of the node 9 is encrypted as the key value 210 of the node 18 that has been updated already and then transmitted to the node 37, and the updated key value 205 of the node 9 is encrypted as the key value 211 of the node 19 and then transmitted to the nodes 38 and 39.

The nodes 32, 33, 34, and 35 under the node 8 and the nodes 37, 38, and 39 under the node 9 share the key value 202 of the node 4. Thus, an updated key value 202 of the node 4 is encrypted as the key value 204 of the node 8 and then transmitted to the nodes 32 through 35. Also, the updated key value 202 of the node 4 is encrypted as the key value 205 of the node 9 and then transmitted to the nodes 37 through 39.

The nodes 32 through 39 under the node 4, except the node 36, and the nodes 40 through 47 under the node 5 share the key value 201 of the node 2. Thus, an updated key value 201 of the node 2 is encrypted as the key value 202 of the node 4 that has been updated and then transmitted to the users 32, 33, 34, 35, 37, 38, and 39. Also, the updated key value 201 of the node 2 is encrypted as the key value 203 of the node 5 and then transmitted to the nodes 40 through 47. Such a key updating process can block accesses of revoked users.

In the above-described method, that is, in the CS model, a transmission overhead is O(r log(n/r)) that is the number of CSs including only non-excluded users, and a storage overhead is O(log n).

An SD model is a modification of the above-described CS model, and requires a storage overhead of $O(\log^2 n)$ and a transmission overhead of O(2r−1) so as to drastically improve the transmission overhead. The SD model considers a subtree obtained by subtracting a subtree having a node w of a subtree, having a node v as a root node, as a root node from the corresponding substree. Leaf nodes under this subtree are authorized users, and leaf nodes under the subtree having the node w the root node are revoked users. If revoked users are placed among an appropriate number of authorized users, the SD model may require a subset unlike the CS model requiring two or more subsets. In the SD model, hash values of keys assigned to nodes from the node v to the node w are obtained, and then values corresponding to the hash values are determined as session keys. Each user has hash values of sibling nodes of each node on a path from the root node to its leaf node as secret keys. Therefore, only authorized users can restore session keys due to the one-way nature of a hash function. In the SD model, a transmission overhead is O(2r−1), a storage overhead is $O(\log^2 n)$, and a computation overhead is O(log n).

Afterward, an LSD model that is an improvement of the SD model was suggested in 2002. In the LSD model, a layer is used for each subtree to reduce a storage overhead to $O(\log^{3/2} n)$. However, the transmission overhead is twice that of the SD model.

The models using the tree structure, such as LSD or SD, show the most remarkable efficiency amongst the BE models as discussed above. However, it is hard to expect further improvement of the methods based on the tree structure because the number of subsets required for broadcasting greatly depends on the locations of the users. Furthermore, the tree structure is considerably costly to maintain. Therefore, there is a demand for a novel BE technique more efficient than the methods using the tree structure.

SUMMARY OF THE INVENTION

The present invention has been provided to address the above-mentioned and other problems and disadvantages occurring in the conventional arrangement, and an aspect of the present invention provides a method for acquiring an encryption key with less computation overhead so that a node who requests a service can decrypt a session key received from a service provider.

An encryption key management method for a broadcast encryption (BE) includes generating a plurality of subgroups, the subgroup consisting of at least one of a plurality of nodes, and forming layers according to a number of nodes which form the subgroup; assigning prime numbers to the subgroups not to overlap one another, and connecting a subgroup at an upper layer with a subgroup, which includes nodes forming the subgroup of the upper layer, at a lower layer; and re-assigning a prime number assigned to a subgroup at an upper layer, a prime number assigned to an unconnected subgroup at the same layer, and a prime number assigned to a subgroup at a lower layer, to each subgroup, and assigning an encryption key which is generated from the re-assigned prime numbers to the each group.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which.

DETAILED DESCRIPTION OF THE EMBODIMENTS

Certain exemplary embodiments of the present invention will now be described in greater detail with reference to the accompanying drawings.

In the following description, the same drawing reference numerals are used for the same elements even in different drawings. Certain matters defined in the description, such as detailed construction and element descriptions, are provided to assist in a comprehensive understanding of the invention. Also, well-known functions or constructions are not described in detail since that would obscure the invention in unnecessary detail.

Figure 3:
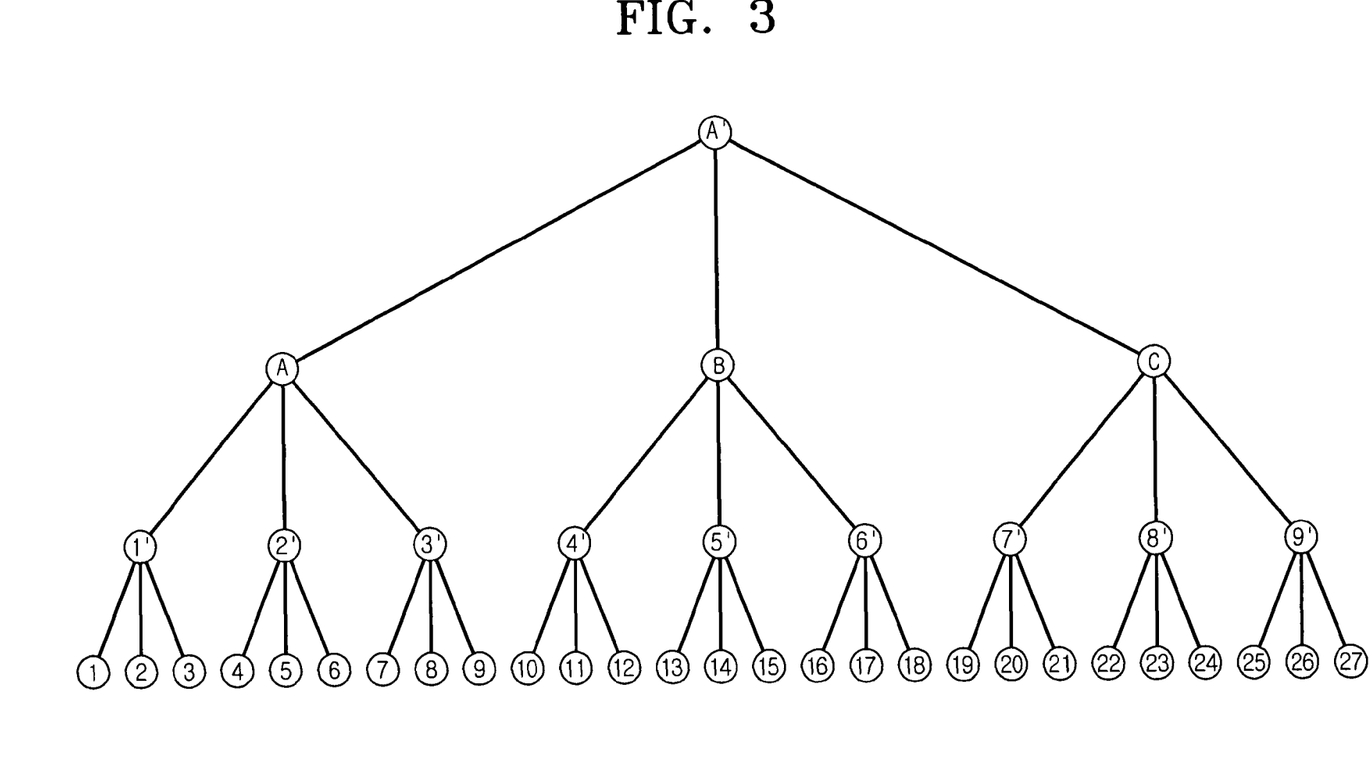
FIG. 3 illustrates a concept of a BE which assigns keys in a tree structure according to an embodiment of the present invention.

FIG. 3 demonstrates a concept of a broadcast encryption (BE) which assigns keys using a tree structure according to an embodiment of the present invention. Referring now to FIG. 3, nodes 1 through 27 intend to receive contents. The nodes intending to receive contents are allocated to one of a plurality of groups. As shown in FIG. 3, nine groups are illustrated and each group consists of three nodes. For example, the first group consists of the nodes 1, 2 and 3 and is managed by a node 1'. Note that the node 1' is a logical node for forming a tree structure, not an actual node which receives the contents.

The second group consists of the nodes 4, 5 and 6, and is managed by a node 2'. The third group consists of the nodes 7, 8 and 9 and is managed by a node 3'. The eighth group consists of the nodes 22, 23 and 24 and is managed by a node 8'. The ninth group consists of the nodes 25, 26 and 27 and is managed by a node 9'.

The tenth group consists of the nodes 1', 2' and 3' and is managed by a logical node A. The eleventh group consists of the nodes 4', 5' and 6' and is managed by a logical node B. The twelfth group consists of the nodes 7', 8' and 9' and is managed by a logical node C. The nodes A, B and C form the thirteenth group, and a logical node A takes charge of the thirteenth group. As such, the nodes which intend to receive contents can form the tree structure. It should be understood that although each group includes three nodes in FIG. 3, the number of nodes in the group can vary according to a user's setting. Similarly, the number of nodes in each group may vary according to a user's setting. For instance, the number of nodes in the first group may be three, and the number of nodes in the second group may be four.

Figure 4:
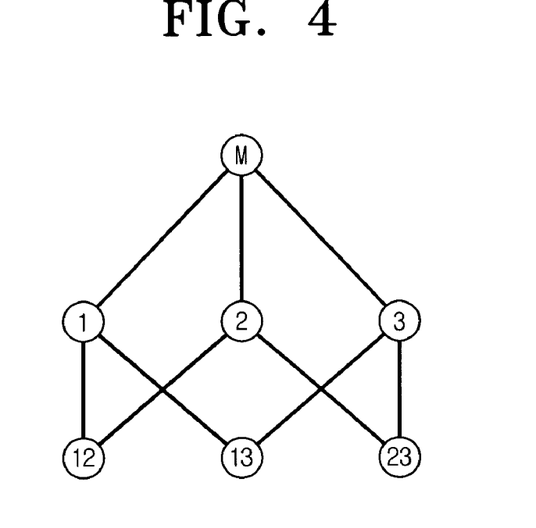
FIG. 4 illustrates interconnections between nodes forming a group and subgroups consisting of the nodes.

Hereafter, how to assign encryption keys to nodes is explained in detail in reference to FIG. 4. As discussed above, each node can acquire a session key by decrypting the encryption key and recover the contents using the acquired session key.

FIG. 4 depicts how encryption keys are assigned to the nodes 1, 2 and 3 in the first group. In FIG. 4, the nodes 1, 2 and 3 are arranged in hierarchy according to a certain basis. At the first layer, a virtual management node M is located to manage the nodes 1, 2 and 3. A subgroup consisting of the nodes 1, 2 and 3 is located at the second layer. At the third layer, subgroups each consisting of two nodes are located. As shown in FIG. 4, a subgroup consists of the nodes 1 and 2, another subgroup consists of the nodes 1 and 3, and the other subgroup consists of the nodes 2 and 3.

The subgroups at the layers are connected one another according to a certain basis. For instance, the management node is connected to all the subgroups at the second layer. The subgroups at the second layer are connected to the corresponding subgroups to which the subgroups at the second layer belong, at the third layer.

Specifically, the node 1 which is the first subgroup at the second layer, is connected with the management node at the first layer and with the first and second subgroups at the third layer. The node 2 which is the second subgroup at the second layer, is connected with the management node at the first layer and with the first and third subgroups at the third layer. The node 3 which is the third subgroup at the second layer, is connected with the management node at the first layer and with the second and third subgroups at the third layer.

Following is a description of a first assignment procedure to sequentially assign prime numbers to the subgroups. '2' is assigned to the management node, and '3' is assigned to the node 1 being the first subgroup at the second layer. '5' is assigned to the node 2 being the second subgroup at the second layer, and '7' is assigned to the node 3 being the third subgroup at the second layer. At the third layer, '11' is assigned to the first subgroup, '13' is assigned to the second subgroup, and '17' is assigned to the third subgroup. Although it has been explained that the prime numbers are assigned to the subgroups in sequence, the prime numbers may be randomly assigned to the subgroups according to a user's setting.

After the first assignment procedure is completed, a second assignment procedure is carried out. The second assignment procedure assigns encryption keys to the nodes or the subgroups.

The second assignment procedure takes advantage of the prime numbers assigned to the subgroups in the first assignment procedure. Each subgroup is assigned the prime number of the subgroup at its upper layer, the prime numbers of its unconnected subgroups at the same layer, and the prime number of the unconnected subgroup at its lower layer. For example, the node 1 is assigned '2' of the management node at the first layer, '5' and '7' assigned to the nodes 2 and 3 which are unconnected nodes at the same second layer, and '17' assigned to the third subgroup which is the unconnected subgroup at the third layer. The first subgroup at the third layer is assigned '2' of the management node at the top layer, '3', '5' and '7' of the nodes 1, 2, 3 at the upper layer, respectively, and '13' and '17' of the second group and the third subgroup which are unconnected subgroups at the same third layer.

In further detail, '2, 5, 7, 17' are re-assigned to the node 1, '2, 3, 7, 13' are re-assigned to the node 2, and '2, 3, 5, 11' are re-assigned to the node 3. At the third layer, '2, 3, 5, 7, 13, 17' are re-assigned to the first subgroup, '2, 3, 5, 7, 11, 17' are re-assigned to the second subgroup, and '2, 3, 5, 7, 11, 13' are re-assigned to the third subgroup.

Upon the completion of the second assignment procedure, actual encryption keys are assigned to the nodes. $\{k_0^{2 \cdot 5 \cdot 7 \cdot 17}\}$, where $k_0$ is an arbitrary constant, is assigned to the node 1, $\{k_0^{2 \cdot 3 \cdot 7 \cdot 13}\}$ is assigned to the node 2, and $\{k_0^{2 \cdot 3 \cdot 5 \cdot 11}\}$ is assigned to the node 3. $\{k_0^{2 \cdot 3 \cdot 5 \cdot 7 \cdot 13 \cdot 17}\}$ is assigned to the first subgroup, $\{k_0^{2 \cdot 3 \cdot 5 \cdot 7 \cdot 11 \cdot 17}\}$ is assigned to the second subgroup, and $\{k_0^{2 \cdot 3 \cdot 5 \cdot 7 \cdot 11 \cdot 13}\}$ is assigned to the third subgroup.

Herebelow, descriptions are provided on how a service provider derives an encryption key to encrypt a session key.

Provided that the nodes 1, 2 and 3 are privileged nodes for receiving contents from the service provider, the service provider uses $\{k_0^{2 \cdot 3 \cdot 5 \cdot 7 \cdot 11 \cdot 13 \cdot 17}\}$ as an encryption key to encrypt the session key. The node 1 acquires the encryption key of the service provider ($\{(k_0^{2 \cdot 5 \cdot 7 \cdot 17})^{3 \cdot 11 \cdot 13}\}$) by using its holding encryption key $\{k_0^{2 \cdot 5 \cdot 7 \cdot 17}\}$, and acquires the session key using the acquired encryption key. Likewise, the node 2 and node 3 acquire the encryption key used by the service provider, using their assigned encryption keys, and thus acquire the session key using the acquired encryption key.

In case that the node 1 is not a privileged node of the service provider, the service provider encrypts the session key using an encryption key $\{k_0^{2 \cdot 3 \cdot 5 \cdot 7 \cdot 11 \cdot 13}\}$ which is assigned to the third subgroup. In this situation, the node 2 can acquire the encryption key used by the service provider ($\{(k_0^{2 \cdot 3 \cdot 7 \cdot 13})^{5 \cdot 11}\}$) by use of its holding encryption key $\{k_0^{2 \cdot 3 \cdot 7 \cdot 13}\}$ and acquire the session key using the acquired encryption key. The node 3 can also acquire the encryption key used by the service provider ($\{(k_0^{2 \cdot 3 \cdot 5 \cdot 11})^{7 \cdot 13}\}$) by use of its holding encryption key $\{k_0^{2 \cdot 3 \cdot 5 \cdot 11}\}$ and acquire the session key using the acquired encryption key.

Meanwhile, the node 1 may acquire the encryption key of the service provider by use of its holding encryption key $\{k_0^{2 \cdot 5 \cdot 7 \cdot 17}\}$. To acquire the encryption key used by the service provider, the node 1 needs to remove $\{k_0^{17}\}$ from its encryption key $\{k_0^{2 \cdot 5 \cdot 7 \cdot 17}\}$. But this is impossible because an exponential function consists of prime numbers owing to its characteristic of a one-way function. Thus, only the node 2 and the node 3 can acquire the session key and receive contents using the acquired session key.

In case that only the node 1 is a privileged node for the service provider, the service provider encrypts the session key using the encryption key of the node 1. At this time, as explained above, the node 2 and the node 3 are not able to acquire the encryption key used by the service provider.

Referring back to FIG. 3, $k_0$ is assigned as a function to be used in the first group, that is, a function used by the node 1', and $k_1$ is assigned as a function to be used in the second group, that is, a function used by the node 2'. $k_7$ is assigned as a function to be used in the eighth group, that is, a function used by the node 8', and $k_8$ is assigned as a function to be used in the ninth group, that is, a function used by the node 9'. The nodes in the second through ninth groups are assigned encryption keys using the assigned functions as aforementioned in reference to FIG. 4.

Functions are assigned to the tenth group consisting of the nodes 1', 2' and 3', the eleventh group consisting of the nodes 4', 5' and 6', and the twelfth group consisting of the nodes 7', 8' and 9' similarly to the first through ninth groups. For instance, kg is assigned as a function to be used in the tenth group, and $k_{10}$ is assigned as a function to be used in the eleventh group. $k_{11}$ is assigned as a function to be used in the twelfth group. Likewise, a function $k_{12}$ is assigned as a function to be used in the thirteenth group consisting of the nodes A, B and C.

The encryption keys assigned to the nodes 1 through 27 which form the tree structure having the first through thirteenth groups, are demonstrated in reference to Table 1.

TABLE 1

| Nodes | Encryption keys assigned |
| --- | --- |
| Node 1 | $k_0^{2 \cdot 5 \cdot 7 \cdot 17}, k_9^{2 \cdot 5 \cdot 7 \cdot 17}, k_{12}^{2 \cdot 5 \cdot 7 \cdot 17}$ |
| Node 2 | $k_0^{2 \cdot 3 \cdot 7 \cdot 13}, k_9^{2 \cdot 5 \cdot 7 \cdot 17}, k_{12}^{2 \cdot 5 \cdot 7 \cdot 17}$ |
| Node 3 | $k_0^{2 \cdot 3 \cdot 5 \cdot 11}, k_9^{2 \cdot 5 \cdot 7 \cdot 17}, k_{12}^{2 \cdot 5 \cdot 7 \cdot 17}$ |
| Node 4 | $k_1^{2 \cdot 5 \cdot 7 \cdot 17}, k_9^{2 \cdot 3 \cdot 7 \cdot 13}, k_{12}^{2 \cdot 5 \cdot 7 \cdot 17}$ |
| Node 5 | $k_1^{2 \cdot 3 \cdot 7 \cdot 13}, k_9^{2 \cdot 3 \cdot 7 \cdot 13}, k_{12}^{2 \cdot 5 \cdot 7 \cdot 17}$ |
| . . . | . . . |
| Node 24 | $k_7^{2 \cdot 3 \cdot 5 \cdot 11}, k_{11}^{2 \cdot 3 \cdot 7 \cdot 13}, k_{12}^{2 \cdot 3 \cdot 5 \cdot 11}$ |
| Node 25 | $k_8^{2 \cdot 3 \cdot 7 \cdot 13}, k_{11}^{2 \cdot 3 \cdot 5 \cdot 11}, k_{12}^{2 \cdot 3 \cdot 5 \cdot 11}$ |
| Node 26 | $k_8^{2 \cdot 3 \cdot 7 \cdot 13}, k_{11}^{2 \cdot 3 \cdot 5 \cdot 11}, k_{12}^{2 \cdot 3 \cdot 5 \cdot 11}$ |
| Node 27 | $k_8^{2 \cdot 3 \cdot 5 \cdot 11}, k_{11}^{2 \cdot 3 \cdot 5 \cdot 11}, k_{12}^{2 \cdot 3 \cdot 5 \cdot 11}$ |

As shown in Table 1, each node is assigned the encryption keys as many as the number of the layers.

The encryption key used by the service provider to encrypt the session is now set forth in detail. Provided that the nodes 1 through 27 are privileged nodes, the service provider uses the encryption key using the function assigned to the thirteenth group. Specifically, the service provider encrypts the session key using the encryption key $\{k_{12}^{2 \cdot 3 \cdot 5 \cdot 7 \cdot 11 \cdot 13 \cdot 17}\}$ so that all the nodes in the thirteenth group can decrypt the session key.

In the event that a revoked node belongs to a group at a lower layer, this is regarded that a node at an upper layer also includes a revoked node. For example, if the node 1 is a revoked node, it is regarded that the first group, the tenth group, and the thirteenth group include the revoked node as well. Descriptions are made on how the service provider determines an encryption key to encrypt the session key when the node 1 is revoked.

As set forth above, when the node 1 is revoked, as the tenth group and the thirteenth group also include the revoked node, the service provider encrypts the session key using an encryption key which is obtainable only by the eleventh group consisting of the fourth, fifth and sixth groups, and the twelfth group consisting of the seventh, eighth and ninth groups. In addition, the service provider encrypts the session key using an encryption key obtainable only by the second group and the third group. Furthermore, the service provider encrypts the session key using an encryption key obtainable only by the node 2 and the node 3 in the first group. In brief, the service provider encrypts the session key using $\{k_{12}^{2 \cdot 3 \cdot 5 \cdot 7 \cdot 11 \cdot 13}, k_9^{2 \cdot 3 \cdot 5 \cdot 7 \cdot 11 \cdot 13}, k_0^{2 \cdot 3 \cdot 5 \cdot 7 \cdot 11 \cdot 13}\}$. Hence, the nodes in the eleventh group and the twelfth group acquire the session key using $\{k_{12}^{2 \cdot 3 \cdot 5 \cdot 7 \cdot 11 \cdot 13}\}$, the nodes in the second group and the third group acquire the session key using $\{k_9^{2 \cdot 3 \cdot 5 \cdot 7 \cdot 11 \cdot 13}\}$, and the node 2 and the node 3 acquire the session key using $\{k_0^{2 \cdot 3 \cdot 5 \cdot 7 \cdot 11 \cdot 13}\}$.

In the event that at least two nodes are revoked amongst the nodes 1 through 27, an encryption key to be used to decrypt the session key is determined in the same manner as described in FIG. 4.

Figure 5:
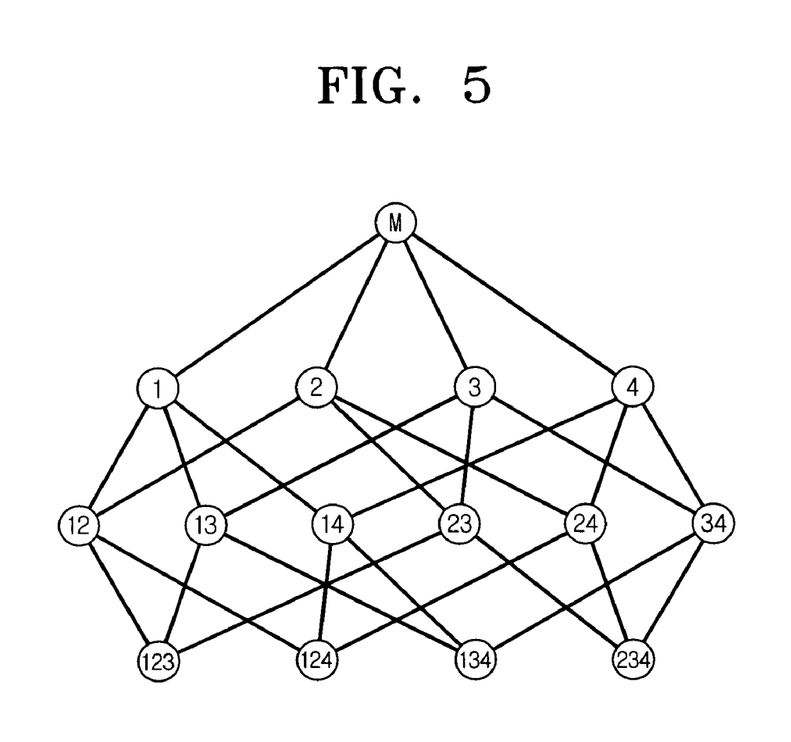
FIG. 5 illustrates interconnections between nodes and subgroups when each group consists of four nodes.

FIG. 5 depicts exemplary groups consisting of four nodes. In FIG. 5, subgroups are connected to one another in the same manner as described in FIG. 4. A difference lies in that the number of assigned prime numbers increases as subgroups consisting of three nodes are added. Thus, prime numbers assigned to the subgroups are '2, 3, 5, 7, 11, 13, 17, 19, 23, 29, 31, 37, 41, 47, 53'.

As the number of nodes in the group increases, the computation overhead to process encryption keys assigned to the nodes also increases. In case that four nodes forming a group are privileged nodes, an encryption key $\{k_0^{2 \cdot 3 \cdot 5 \cdot 7 \cdot 11 \cdot 13 \cdot 17 \cdot 19 \cdot 23 \cdot 29 \cdot 31 \cdot 37 \cdot 41 \cdot 47 \cdot 53}\}$ is used by the service provider. As such, as the number of nodes forming the group increases, an exponent of the exponential function increases and thus the computation overhead at nodes increases.

Figure 6:
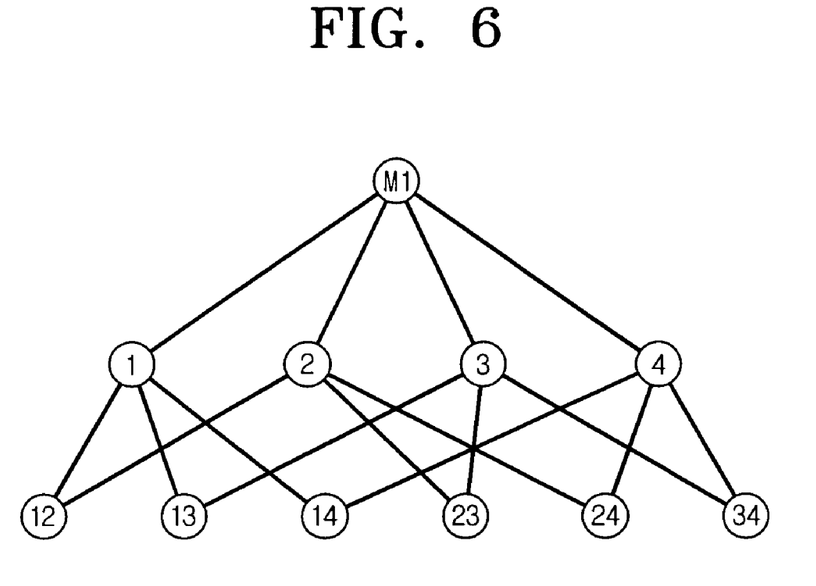
FIG. 6 illustrates subgroups which are split by layers when each subgroup consists of two nodes.
Figure 7:
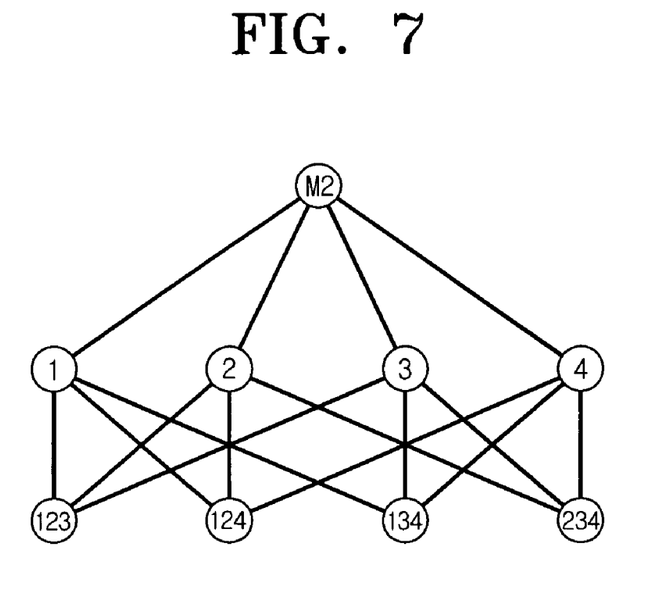
FIG. 7 illustrates other subgroups which are split by layers when each subgroup consists of three nodes.

FIGS. 6 and 7 depict schemes for resolving the problems in FIG. 5. Particularly, FIG. 6 depicts subgroups being nodes and subgroups consisting of two nodes, and FIG. 7 depicts subgroups being nodes, and subgroups consisting of three nodes. How to assign encryption keys to nodes is now mentioned in detail in reference to FIGS. 6 and 7.

In FIG. 6 and FIG. 7, the encryption key assignment procedure is the same as in FIG. 4. Only a difference lies in that the function used in FIG. 6 is different from the function used in FIG. 7. In further detail, in FIGS. 6 and 7, nodes forming a group are assigned encryption keys using two functions. For example, let the function used in FIG. 6 be $k_{01}$ and the function used in FIG. 7 be $k_{02}$. Then, each node is assigned encryption keys using $k_{01}$ and $k_{02}$.

If two nodes in a group are revoked, the service provider encrypts the session key using an encryption key with $k_{01}$. If one node is revoked, the service provider encrypts the session key using an encryption key with $k_{02}$. Since two encryption keys are assigned to each node in the group, the computation overhead processed by each node can be reduced. Note that the number of encryption keys held by each node increases.

While the computation overhead is reduced when two encryption keys are assigned to each node in one group, a computation overhead required by a user may not be satisfied. Referring to FIG. 6, prime numbers assigned to nodes and subgroups are '2, 3, 5, 7, 11, 13, 17, 19, 23, 29, 31'. In this case, the nodes in FIG. 6 process relatively less computation overhead than the nodes in FIG. 5. Yet, the user may require far more less computation overhead.

Figure 8:
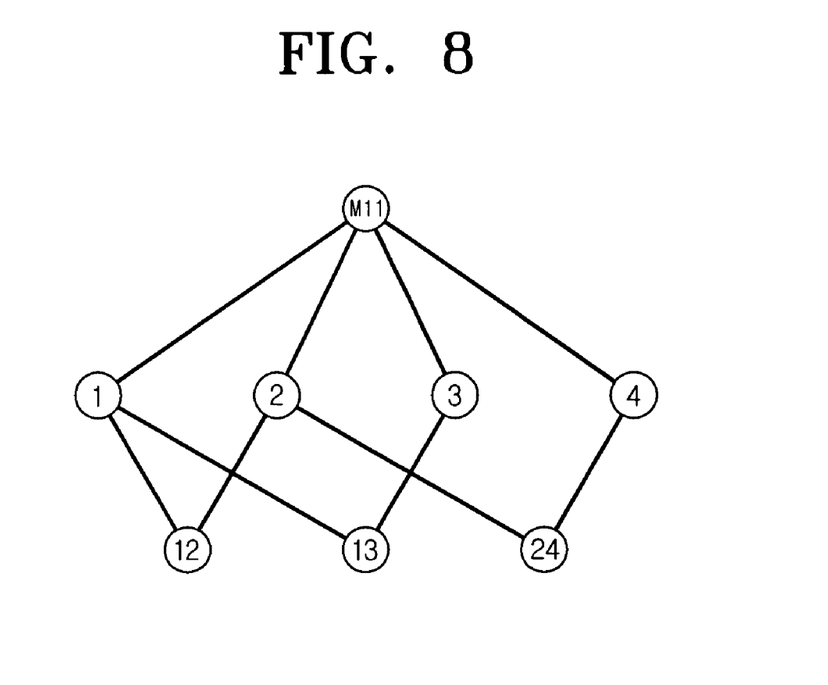
FIG. 8 illustrates split subgroups which form a layer.
Figure 9:
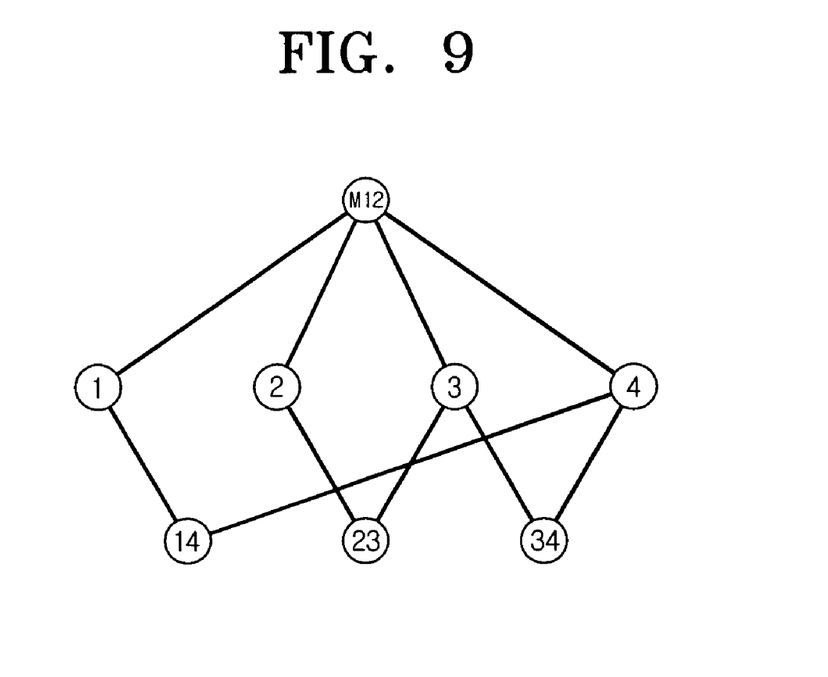
FIG. 9 illustrates split subgroups which form a layer.

FIGS. 8 and 9 depict schemes for resolving the disadvantages of FIG. 6, to be explained now.

In FIG. 8 and FIG. 9, the subgroups of FIG. 6 are split. Six subgroups in FIG. 6 are re-grouped into two groups. FIG. 8 depicts that a subgroup consists of the node 1 and the node 2, a subgroup consists of the node 1 and the node 3, and a subgroup consists of the node 2 and the node 4. FIG. 9 depicts that a subgroup consists of the node 1 and the node 4, a subgroup consists of the node 2 and the node 3, and a subgroup consists of the node 3 and the node 4. It is appreciated that the number of split subgroups may vary according to a user's setting.

Mutual connections among the nodes and the subgroups are the same as illustrated in FIG. 4, and thus detailed descriptions thereof are omitted to be concise. To address the disadvantages of FIG. 6, the number of functions required to derive encryption keys assigned to nodes is increased. Specifically, encryption keys are assigned to the nodes using a single function in FIG. 6, whereas encryption keys are assigned to the nodes using their intrinsic functions in FIGS. 8 and 9 being split from FIG. 6. Encryption keys using the function $k_{011}$ are assigned to nodes in FIG. 8, and encryption keys using the function $k_{012}$ are assigned to nodes in FIG. 9. In other words, each node is assigned the encryption key using the function $k_{011}$ and the encryption key using the function $k_{012}$. Accordingly, while the number of encryption keys assigned to each node increases, the computation overhead required to acquire the session key can be reduced.

Consequently, the user can regulate the number of encryption keys assigned to each node and the computation overhead processed by each node.

In the light of the foregoing as set forth above, the present invention can lower the transmission overhead which is the most crucial factor in the broadcast encryption (BE). Furthermore, it is possible to drastically reduce the transmission overhead in comparison with the SD which is known as the most effective scheme so far.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An encryption key management method of an encryption key management system for a broadcast encryption (BE) of a data transmission system, comprising:
   generating a plurality of subgroups, each subgroup consisting of at least one of a plurality of nodes, and forming layers according to a number of nodes which form the subgroup;
   assigning prime numbers to the subgroups not to overlap one another, and connecting a subgroup at an upper layer with a subgroup, which includes nodes forming the subgroup of the upper layer, at a lower layer; and
   re-assigning a prime number assigned to a subgroup at an upper layer, a prime number assigned to an unconnected subgroup at the same layer, and a prime number assigned to an unconnected subgroup at a lower layer, to each of the subgroups, and assigning an encryption key which is generated from the re-assigned prime numbers only except for the prime numbers assigned by the assigning to each of the subgroups,
   wherein, if a revoked node is included in the nodes, a session key is encrypted using an encryption key which is assigned to a subgroup consisting of nodes other than the revoked node, thereby the revoked node is not capable of obtaining the session key.

2. The encryption key management method of the encryption key management system of claim 1, wherein a virtual management node is located at the top of the layers to manage subgroups consisting of one node.

3. The encryption key management method of the encryption key management system of claim 1, wherein, if a number of nodes is N, the subgroup is one of a subgroup consisting of the management node, subgroups consisting of one node, subgroups consisting of two nodes, . . . , and subgroups consisting of (N−1) nodes.

4. The encryption key management method of the encryption key management system of claim 3, wherein the subgroups are split into at least two groups, and encryption keys which are derived using intrinsic functions are assigned to the split groups.

5. The encryption key management method of the encryption key management system of claim 4, wherein the split groups include the subgroup consisting of the management node, and the subgroups consisting of one node.

6. The encryption key management method of the encryption key management system of claim 5, wherein each of the nodes is assigned encryption keys equal to the number of the split groups.

7. The encryption key management method of the encryption key management system of claim 1, wherein each of the nodes is assigned an encryption key which is derived using an exponential function having the re-assigned prime numbers as an exponent.

* * * * *